ORAL TREATMENT APPLIANCE

Original Filed May 24, 1963

INVENTORS:
ISAAC I. MUROV
MORTON J. SCHLOSS
FRANCIS V. PANNO

BY Karl G. Ross
AGENT

ORAL TREATMENT APPLIANCE

Original Filed May 24, 1963

ISAAC I. MUROV
MORTON J. SCHLOSS
FRANCIS V. PANNO
INVENTORS.

BY Karl G. Ross
AGENT

ORAL TREATMENT APPLIANCE

Original Filed May 24, 1963

ISAAC I. MUROV
MORTON J. SCHLOSS
FRANCIS V. PANNO
INVENTORS

BY Karl G. Ross
AGENT

United States Patent Office

Re. 26,589
Reissued May 27, 1969

26,589

ORAL TREATMENT APPLIANCE

Isaac I. Murov, Shrub Oak, N.Y. (Mohegan Lake, N.Y. 10547), Morton J. Schloss, Scarsdale, N.Y. (210 E. 68th St., New York, N.Y. 10021), and Francis V. Panno, Lanhmont, N.Y. (444 E. Boston Post Road, Mamaroneck, N.Y. 10543)

Original No. 3,214,775, dated Nov. 2, 1965, Ser. No. 282,979, May 24, 1963. Application for reissue Feb. 16, 1967, Ser. No. 632,832

Int. Cl. A47l *21/02, 23/02;* A61h *9/00*

U.S. Cl. 15—22 32 Claims

Matter enclosed in heavy brackets [ ] appears in the original patent but forms no part of this reissue specification; matter printed in italics indicates the additions made by reissue.

*ABSTRACT OF THE DISCLOSURE*

*The oral treatment appliance involves means for irrigating oral tissue with a jet of liquid, usually water, t · is mechanically oscillated at a relatively rapid rate to change the target area of the jet as it is manually moved to direct the jet over selected areas of the oral tissue. Brushing or massaging of the oral tissue may be simultaneously carried out by suitable means.*

*The appliance for the oral treatment comprises a handle housing a power drive for an appliance which is movably mounted on the handle. The appliance includes a head, such as a brush, massager or irrigator, and a rod operably connected to the drive for longitudinal, transverse and/or angular motion. A bore having a long portion going through the rod and a short portion venting from the head is connected to a source of liquid, such as a water faucet, which preferably also drives a liquid motor such as a rotor.*

*Description*

Our present invention relates to [toothbrushes having] *oral treatment appliances* [movable bristles] and, more particularly, to fluid-powered toothbrushes, gum massagers and irrigators for dental hygiene and oral treatment in general.

Recently, it has been found that toothbrushes and the like having movable bristles greatly improve the removal of foreign particles from between the teeth and provide the necessary gum massage for healthy teeth. It has been proposed, therefore, to provide toothbrushes with electrically powered bristles which either contain their own power source (i.e. batteries) or are connected to line current. On the one hand, these devices are awkward since they must be made massive enough to contain an electric motor and, in some cases, the power source, while, on the other hand, units connected to an electric line may prove to be dangerous upon fracture against a sanitary fixture and/or immersion in water. Frequently, it is desirable to provide a more or less continuous stream of cleansing liquid to irrigate the mouth concurrently with operation of the bristles to remove particles of foreign matter from between the teeth. Such irrigation is not generally possible with electrically operated toothbrushes of the type disclosed above and would require substantial modification thereof if electric shock was to be avoided.

It is, therefore, an object of the present invention to provide an improved toothbrush wherein the electrical drive means for the bristles of earlier devices can be avoided.

Another object of this invention is to provide a toothbrush wherein a mechanical movement can be imparted to the bristles concurrently with an irrigation of the oral cavity.

Yet another object of the invention is to provide [a] *an oral appliance* [toothbrush] of this character particularly adapted for efficient gum massage and irrigation together with or in place of a cleansing of the teeth.

The above objects and others which will become apparent hereinafter are attained, in accordance with our invention, by providing [a fluid-powered toothbrush which] *a power driven appliance which* comprises handle means and [brush] *appliance* means movably mounted on the handle means, the latter containing a fluid-operable source of motive power coupled with the [bristle] *appliance* means. The handle is, therefore, provided with a conduit for connection to the spigot of a faucet (e.g. that of a conventional sanitary fixture) for enabling the establishment of a fluid-pressure differential across this source of motive power.

The handle is, advantageously, also provided with a return tube, which may, if desired, be inserted in the drain of the sanitary fixture for returning thereto, as a waste liquid, all or a portion of the driving liquid while any remainder is directed into the oral cavity as an irrigant and flushing liquid.

According to another feature of the instant invention, the handle means is provided with a chamber along the path of the motive liquid for receiving a water-entrainable detergent, dentifrice or disinfectant agent for facilitating the cleaning of the teeth and/or destroying undesirable bacteria in the oral cavity. Advantageously, valve means may be provided on the handle for shunting liquid away from the detergent chamber when introduction of the cleaning agent into the mouth is not desired. This valve means, or another suitably provided, can also serve, according to the invention, to regulate the flow of liquid to the drive means. It is thus possible to dispose the additive chamber rearwardly of the drive means in the path of the water through the handle and to position a by-pass valve rearwardly of the drive means and/or this chamber for shunting the water to the return tube prior to contact of the liquid with the additive. The valve thus serves as a control means regulating the passage of the liquid through the drive means. The latter advantageously comprises a vaned wheel rotatably journaled in the housing and directly provided with the brush bristles for displacing same or coupled with the brush means via a suitable transmission in order to effect translation and/or rotation of the bristles. The brush means is preferably removably mounted on the housing so that it can be interchangeable with a massaging or irrigating device and with other brushes for sanitary operation. The massaging device can include one or more rubber tips which, like the bristles, are displaced by the drive means.

According to another specific feature of the invention the drive means includes a reciprocable rod upon which the brush bristles can be mounted for displacement longitudinally of the housing means or in a transverse direction. The rod can thus be connected to the rotary, water-driven wheel by an eccentric or crank. It is also possible to provide this rod with a pivot so that a combined translation and rotation is impared to the brush.

Still another feature of this invention resides in the provision of valve means for selectively controlling the flow of liquid into the oral cavity in addition to effecting introduction of a detergent and control of movement of the bristles.

The above and other objects, features and advantages of the present invention will be more readily apparent from the following description, reference being made to the appended drawing in which.

Figure 1:
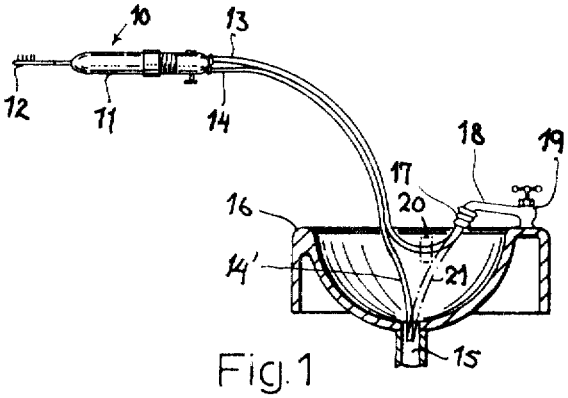
FIG. 1 is an elevational view with parts broken away to show a toothbrush, according to the invention, in its operative condition.

FIG. 1 shows a toothbrush 10 whose handle portion 11 carries a reciprocable brush head 12 and is provided with inlet-conduit means 13 and an outlet tube 14. For convenience the outlet tube 14 may be affixed to conduit means 13 over substantially its entire length and may have a terminal portion 14' which can be inserted into the drain 15 of a wash basin 16. Conduit 13 is provided with sleeve 17 of resiliently expandable material adapted to slip over the spigot 18 of the fixture faucet 19. It should be noted that other conventional means for attaching the conduit 13 to the faucet may be provided. In some instances it may be desirable that the spigot 18 has a removable adapter over which the conduit 13 is urged to provide this tube with a strap clamp for affixing it to the conduit. A similar conduit means and return tube will, of course, be provided for each of the devices to be described in detail hereinafter. It should be noted that a pressure booster 20 (indicated in dot-dash lines) can be provided on the inlet conduit 13 to increase the pressure supplied to the toothbrush 10 if the supply pressure is insufficient to operate the brush. Such a booster makes use of the kinetic energy of a relatively large volume of water to increase the potential energy of a similar volume (e.g. by means of a rotor, driven by the large-volume/low-pressure flow of water, coupled with an impeller for displacing a low-volume/high-pressure stream). Moreover, the adapter provided, on the spigot 18 may include a Venturi aspirator 21 to increase the pressure differential across the fluid-operated drive source. The aspirator, known per se, may also provide the entire flow of operating fluid.

In FIGS. 2–5 we show a toothbrush of the general type illustrated in FIG. 1 and having a reciprocating head. This brush 100 comprises a handle portion 110 which forms a housing for the rotor 111 of the drive means. Rotor 111 is journaled on a shaft 112 received in a wall of the housing 110 and carries an eccentric pin 113 which projects into a slot 114 in the enlarged extremity 115 of a reciprocating rod 116. This extremity 115 has longitudinal sides 117 extending parallel to respective longitudinal walls 118 of housing 110 and the longitudinal axis thereof and is linearly guided therealong by a plurality of ball bearings 119 received in this extremity 115 of the rod 116.

Figure 2:
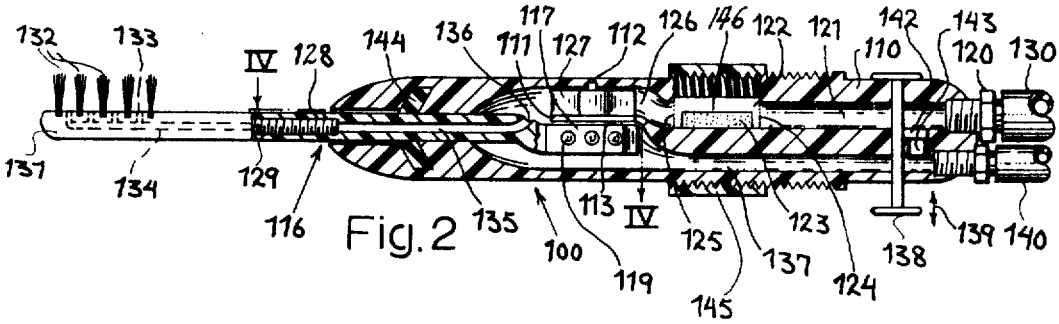
FIG. 2 is a longitudinal cross-sectional view showing the toothbrush with its linearly reciprocating bristle head.
Figure 3:
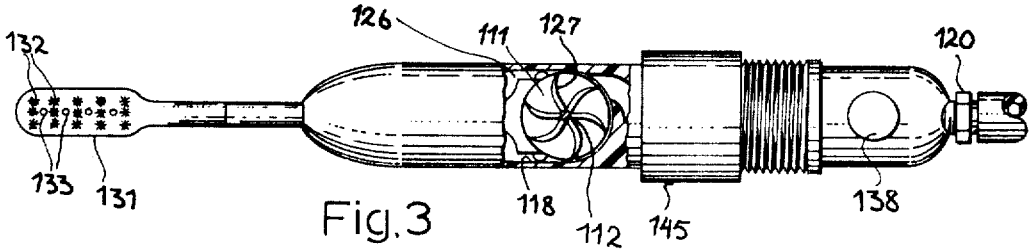
FIG. 3 is a top view of this toothbrush with parts broken away.
Figure 4:
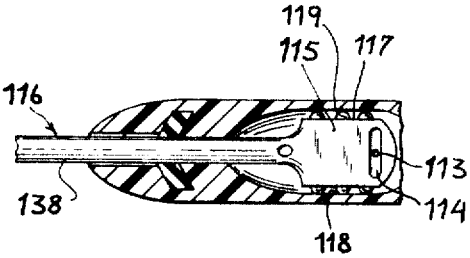
FIG. 4 is a detail cross-sectional view taken generally along the line IV—IV of FIG. 2.
Figure 5:
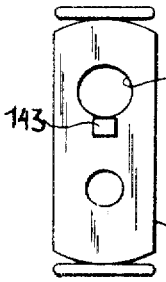
FIG. 5 is an enlarged view of the valve of FIG. 2.

The handle 110 is provided with an inlet fitting 120 over which is forced the inlet conduit 130 whose other end communicates with the spigot of the sanitary fixture as previously noted. The handle is also provided with an inlet bore 121 registered with the conduit 130 and interrupted by a chamber 122 in the housing 110 adapted to receive a dentifrice, detergent, disinfectant, medicament or the like. As indicated in FIG. 2, this additive may be in the form of a slow-dissolving tablet 123 although powders or granules may be used as desired. The chamber 122 is provided with screened openings 124, 125 to prevent entrance to the tube 135 of excessive quantities of solid material while permitting the flow of water therethrough to entrain, by dissolution, the detergent. The screens should, however, be dimensioned to pass abrasive particles normally associated with dentifrices without permitting passage of agglomerates of such particles. The detergent chamber 122 communicates with the rotor chamber 126 for directing a stream of water against the blades 127 of the rotor 111.

The shank portion 128 of reciprocating rod 116 is formed internally with a thread designed to receive the threaded extremity 129 of a suitably removable appliance. As indicated in FIG. 2, this appliance may comprise a brush 131 formed with tufts 132 of the usual bristles and apertures 133 for a stream of irrigation water for flushing the oral cavity and carrying the dentifrice thereto. These apertures 133 are supplied by a bore 134 in the brush head 131 which, in turn, communicates with a passage 135 extending longitudinally along rod 116. Passage 135 opens into the rotor chamber at 136 so that the motive liquid, after passing the motor 111, can enter the passage 135 and serve to irrigate the oral cavity. The rotor chamber 126 also communicates with an outlet bore 137 which supplies the return tube 140. A plunger-type valve 138 is also provided in the handle 110 to shunt liquid from the inlet tube 130 to the outlet tube 140 without passing through the detergent chamber 122 or the rotor chamber 126 when the brush is not to be reciprocated and irrigation of the mouth is not desired. To this end the valve 138 consists of a plate extending transversely to the direction of liquid flow and can be shifted as indicated by arrow 139. The plate is formed with an aperture 141 adapted to register with bore 121 in the operative condition of the valve and the toothbrush as well as with a flange 142 normally blocking an opening 143 communicating between the inlet and outlet bores 121, 137. When the valve 138 is pressed inwardly, opening 143 is uncovered while passage 121 is blocked to divert the flow of fluid from inlet 130 to outlet 140. Sealing means 144 is provided along the shank portion of rod 116 to prevent the escape of liquid therearound. The handle can be provided with a plurality of such brushes each of which is assigned to one member of the household, for hygienic purposes. A conventional air gap can be provided, if desired, in either the inlet or outlet tube to conform to sanitary laws.

When the device is to be used as a mechanically reciprocated toothbrush, the user positions the inlet tube 130 with its adapter on the faucet and turns on the water while maintaining the valve 138 in its depressed condition. Sleeve 145, threadedly surrounding the handle 110, is then rotated to expose the lateral opening 146 through which a tablet of detergent 123 can be inserted by the user into chamber 122. The opening is then closed by reverse rotation of the sleeve. Valve 138 is then shifted into its operative position, whereupon water flows through the detergent chamber 122 to entrain the dentifrice therein and drive the motor 111 to reciprocate the brush. Concurrently a stream of liquid carrying the detergent passes into the oral cavity through the apertures 133. When it is desired to brush the teeth without irrigation or vibration of the brush head 131, valve 138 is again depressed to cut off the flow of liquid to the detergent and rotor chambers.

Figure 6:
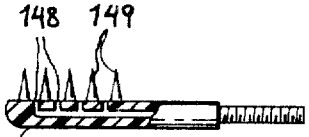
FIG. 6 is a side view, partly broken away, showing a massaging head adapted to be substituted for a brush head of the device.

If a massaging action with irrigation is required, the massaging head 147 of FIG. 6 is threaded into the reciprocated rod 116 in place of brush head 131. The massaging head is formed with apertures 148 to admit a stream of liquid, with or without medicament or dentifrice, to the oral cavity and is provided with rubber tips 149 which effect the massaging action.

Figure 7:
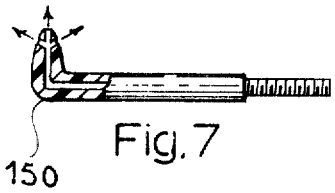
FIG. 7 is a cross-sectional view similar to that of FIG. 6 showing an irrigator attachment for the tooth brush.

Similarly, if only irrigation is required, the irrigator 150 of FIG. 7 is employed. The irrigator will, in this case, be oscillated although means may be provided for locking it in position if a stationary head is a necessity.

Figure 8:
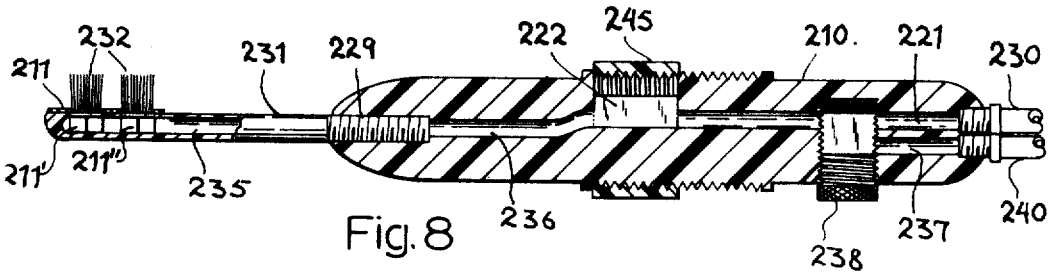
FIG. 8 is a view similar to FIG. 2 showing a brush with rotary bristles in accordance with a modification of the invention.
Figure 9:
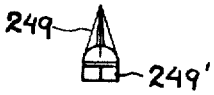
FIG. 9 is a side-elevational view of a massaging device adapted to be substituted for the brush of FIG. 8.
Figure 10:
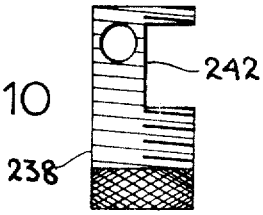
FIG. 10 is a detail view of the valve of the toothbrush of FIG. 8.

The embodiment of FIGS. 8–10 is similar in some respects to that of FIGS. 2–7 in that the handle portion 210 of the brush is provided with a rotatable sleeve 245 through which the interior of the detergent chamber 222 can be exposed for inserting a tablet into the latter. The handle is also provided with an inlet bore 221, communicating with the conduit 230, and an outlet bore 237 which supplies fluid to the return tube 240. In the present embodiment, however, the pressure-type valve is replaced by a screw-type valve 238 which is provided with a recess 242 for by-passing fluid from the inlet bore 221 to the outlet passage 237 in a close condition of the valve. The reciprocating rod characterizing the embodiment of FIG. 2 is dispensed with in the structure of FIG. 8; a brush head 231 has its threaded end 229 received directly in the handle 210. The fluid thus flows from the detergent chamber 222 through a passage 236 into the bore 235 of the brush head whereupon it drives the brushes 232 secured to respective rotors 211', 211'', whose pivots are journaled in the head 231. The water is directed tangentially against the rotors 211', 211'' whose vanes or ribs can be similar to the ribs 127 previously described. After driving these rotors, the fluid passes into the oral cavity through the openings in which the brushes are recessed. If desired, a return tube similar to tube 137 (FIG. 2) can be provided in this embodiment for carrying excess liquid to tube 240 as previously described. The brushes 232 are held in place by slidable plates 211 and can be removed by withdrawing these plates to permit substitution of the massaging tip 249 of FIG. 9. This tip also has a rotor 249' associated therewith. When valve 238 (FIG. 10) is opened, liquid flows through the detergent chamber 222 and drives the rotors 211', 211'' or 249' to rotate either the brushes 232 or the massaging tube 249 while irrigating the mouth.

Figure 11:
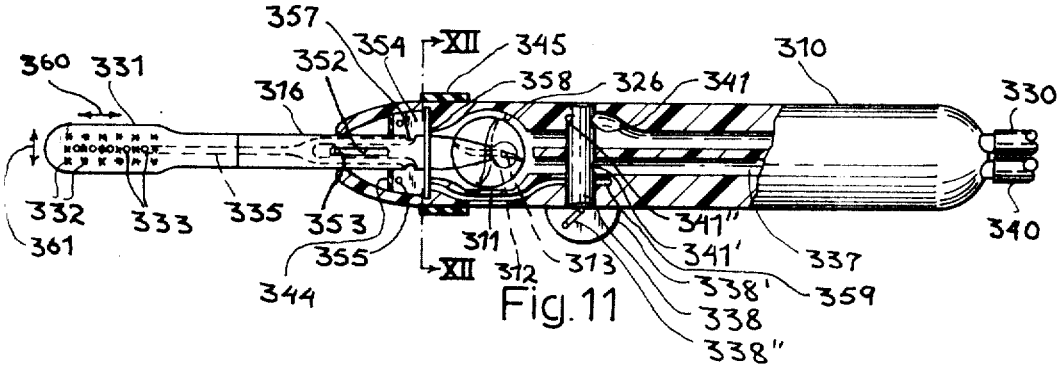
FIG. 11 is a longitudinal cross-sectional view through yet another toothbrush according to our invention.
Figure 12:
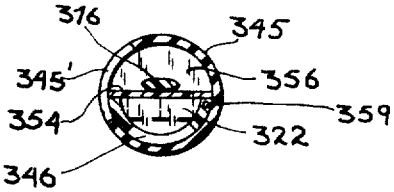
FIG. 12 is a cross-sectional view taken along the line XII—XII of FIG. 11.

In FIGS. 11 and 12 there is shown a toothbrush whose brush head 331 carries the usual bristles 332 and is provided with apertures 333 through which liquid can pass into the oral cavity via a passage 335 in a reciprocating rod 316. The rod of this embodiment is, however, provided with a slot 352 in which a pin 353 of the handle portion 310 is slidably received. As will be apparent from FIG. 12, the interior of the handle portion 310 is subdivided by a partition 354 into upper and lower chambers. The lower chamber 322 is provided with an opening 346 through which an additive tablet can be inserted when sleeve 345 is rotated to align its window 345' with opening 346. A pair of apertures 355 serve to admit fluid from the detergent chamber 322 into an upper compartment 356 from whence the detergent-carrying liquid enters bore 335 via openings 357. The usual flexible seals 344 are provided along the rod 316 while a flexible diaphragm 358 serves to prevent liquid in the rotor chamber from entering this upper compartment. In the rotor compartment 326, below partition 354, water from inlet 330 passes around the rotor 311 which is journaled on a pin 312 to the housing 310 and rotates it. An eccentric pin 313 connects the rotor 311 with the reciprocating rod 316. Return flow from the rotor chamber passes through an outlet bore 337 to tube 340. A three-position valve is provided in the handle of the brush to control the flow of liquid.

The tubular valve 338 which can be displaced by a rotatable actuating disk 338' coupled therewith by a link 338'' is provided with an inlet opening 341 which registers with the narrow bore communicating with tube 330. With the valve in the position shown in FIG. 11, water flows through the inlet passage from tube 330 into the valve 338 and thence out, via an opening 341' therein, to the return tube 340. When actuating disk 338' is displaced in a counterclockwise manner by a fractional rotation, as defined by an indexing spring of the conventional type and not shown herein, the valve 338 is shifted so that opening 341' supplies some fluid to a channel 359 which supplies the detergent chamber 322 and then admits the detergent-containing liquid to the brush head 331. A further displacement of the disk 338' in counterclockwise direction aligns opening 341'' with the inlet passage so that fluid from tube 330 is supplied to the rotor 311 to oscillate the brush head. The motion of the brush head will be a combination of a longitudinal movement as indicated by arrow 360 and transverse movement as indicated by arrow 361. The brush head 331 may, of course, be interchangeable with massaging and irrigating heads as previously described.

The handle 410 of brush 400 (FIGS 13 and 14) is provided with a slot 400a through which the rod 416, carrying the brush head 431 with the usual irrigating apertures and passage, slidably passes. The rod 416, however, is not linearly guided as indicated in FIG. 2 but is formed with a twist about the longitudinal axis of the handle 410. In addition, the rotor 411 is connected eccentrically to the rod via a pin-and-slot joint 413 so that rotation of the rotor, as previously described, effects a simultaneous longitudinal displacement of the brush (arrow 460) and angular displacement (arrow 461) about the longitudinal axis to sweep food particles downwardly from crevices between the teeth, the slot of the joint permitting swiveling action of the rod 416.

Figure 15:
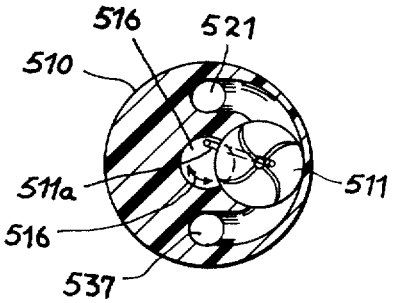
FIG. 15 is a diagrammatic view of the operating mechanism of still another toothbrush according to a further modification.

A similar angular displacement about an axis parallel to the longitudinal axis of the brush results from the device of FIG. 15. In this case, the toothbrush handle 510 has the rotor 511 journaled for rotation about the brush axis and supplied by passage 521, while passage 537 conducts fluid not employed as an irrigant away. The rotor 511 is coupled via a link 511a with the rotatable brush rod 516, which can be similar to the brush rod 416, to angularly reciprocate it about an axis parallel to that of the brush (arrow 461).

Figure 13:
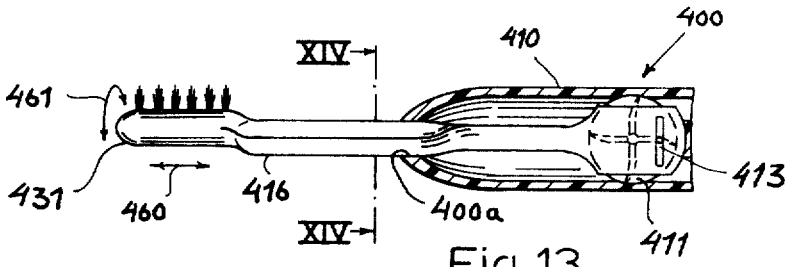
FIG. 13 is a diagrammatic longitudinal cross-sectional view of the reciprocating mechanism for the brush head of another toothbrush according to the invention.
Figure 14:
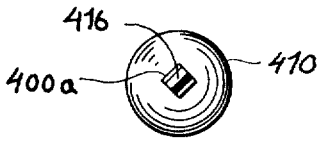
FIG. 14 is a cross-sectional view taken along the line XIV—XIV of FIG. 13.

*In the oral appliances of FIGS. 2, 11 and 13, whether a brush head 131, a massaging head 147 or an irrigator 150 is secured to the rod 116, 316 or 416, respectively, there is a passage or bore extending from the chamber in the handle means where liquid is available when the device is connected to a source of liquid to the aperture in the head which is long in the axis of the rod compared to the short portion which connects it to the aperture. This makes it possible to move the head around in the oral cavity manually from the handle means while the head is rapidly oscillated by the power drive. The oscillation of the short portion of the passage moves the stream or jet of liquid issuing from the aperture and thus changes the target area on the oral tissue toward which it is directed even when the handle means is stationary. By manually moving the handle means the head can be brought over all the selected areas of oral tissue to be treated either by liquid alone, by liquid and brushing, by liquid and massaging, etc., as desired by the user. The movement of the short portion of the passage may be along the axis of the long portion when the rod is reciprocated, or transverse thereto when it is moved around a fixed pivot, or angularly thereto when it is rocked, or a combination of these movements as in FIGS. 11 and 13. In all these cases the movement is cyclic.*

*When the motion of the rod carrying the head has an axial or longitudinal direction, whether combined or not*

*with motion in a transverse or angular direction, the long portion of the passage is alternately lengthened and shortened in reference to the inlet of the liquid into the handle means.*

*The rate of the oscillations of the head can be controlled by the user by moving the valve 138, 338 or a similar valve in the embodiment of FIG. 13 to a desired position of adjustment.*

The invention described and illustrated is believed to admit of many modifications within the ability of persons skilled in the art, all such modifications being considered within the spirit and scope of the appended claims.

We claim:

1. A fluid-powered toothbrush comprising handle means; brush means movably mounted on said handle means and including an elongated shank extending therefrom and longitudinally and transversely displaceable thereon while being provided with a brush remote from said handle means; fluid-operable drive means in said handle means operatively coupled with said brush means for displacing same upon establishment of a fluid-pressure differential across said drive means, said drive means including a rotor in said handle means, and transmission means coupling said shank with said rotor for displacing said shank with a longitudinal and a transverse component of movement to impart an oscillating movement to said brush; conduit means for connecting said handle means with a source of liquid for establishing a pressure differential across said rotor, said shank being provided with an outlet for an irrigation liquid and with a passage communicating between said outlet and said handle means for conducting at least a portion of the fluid employed to operate said rotor to said outlet; and valve means in said handle for regulating the flow of liquid to said drive means and through said passage.

2. A fluid-powered tooth brush as defined in claim 1 wherein said handle means is provided with a compartment along the path of fluid fed to said passage for retaining an additive entrainable by the irrigating liquid, said handle means having an opening communicating with said compartment for replacement of said additive therethrough, and closure means for normally closing said opening.

3. A fluid-powered toothbrush comprising handle means, brush means movably mounted on said handle means and including an elongated shank extending therefrom and longitudinally and transversely displaceable thereon while being provided with a brush remote from said handle means; fluid-operable drive means in said handle means operatively coupled with said brush means for displacing same upon establishment of a fluid-pressure differential across said drive means; conduit means for connecting said handle means with a source of liquid for establishing a pressure differential across said drive means, said drive means including a rotor, displaceable by said liquid under said differential; irrigating means in said handle means and said brush means for supplying a portion of said liquid to said brush means and discharging it at said brush; and transmission means operatively connecting said rotor with said shank for displacing same upon rotary displacement of said rotor.

4. A fluid-powered toothbrush as defined in claim 3, wherein said transmission means includes guide means on said handle means for imparting to said shank a component of motion generally transverse to the direction of its longitudinal reciprocation.

5. A fluid-powered toothbrush as defined in claim 4 wherein said guide means is so arranged and constructed as to impart to said brush a generally elliptical movement in the plane of said longitudinal reciprocation.

*6. An oral appliance comprising:*

*(a) means forming a passage having an inlet, a relatively long portion in one direction and at least one relatively short portion at a substantial angle to the said one direction and terminating in an orifice,*

*(b) means for connecting the inlet of said passage to a source of liquid under pressure to cause liquid to flow through said passage and discharge as a jet from said orifice,*

*(c) means for moving the short portion of said passage to enable the user to direct the jet onto and over selected areas of oral tissue, and*

*(d) mechanical means for oscillating the short portion of said passage to change the target area of the jet in a cyclic manner.*

*7. An oral appliance as set forth in claim 6 in which the means for moving the short portion of the passage is a handle and said mechanical means oscillates the short portion of the passage in the direction of the axis of the long portion toward and away from said handle whereby the long portion is alternately lengthened and shortened by said oscillation.*

*8. An oral appliance as set forth in claim 6 in which the means for moving the short portion of the passage is a handle and said mechanical means oscillates the short portion of the passage in a direction transverse to the axis of the long portion.*

*9. An oral appliance as set forth in claim 6 in which the means for moving the short portion of the passage is a handle and said mechanical means oscillates the short portion of the passage toward and away from the handle and in a direction transverse to the axis of the long portion whereby the long portion is alternately lengthened and shortened by said oscillation.*

*10. An oral appliance as set forth in claim 6 in which the means for moving the short portion of the passage is a handle and said mechanical means oscillates the short portion of the passage angularly around the axis of the long portion.*

*11. An oral appliance as set forth in claim 6 in which the means for moving the short portion of the passage is a handle and said mechanical means oscillates the short portion of the passage toward and away from the handle and in a direction angularly around the axis of the long portion whereby the long portion is alternately lengthened and shortened by said oscillation.*

*12. An oral appliance as set forth in claim 6 which further comprises means for applying massaging action to the oral tissue adjacent to the target area of the jet.*

*13. An oral appliance as set forth in claim 12 in which the means for applying massaging action is tufts of bristles.*

*14. An oral appliance as set forth in claim 12 in which the means for applying massaging action is at least one rubber tip.*

*15. A power driven oral appliance comprising:*

*(a) handle means;*

*(b) appliance means movably mounted on said handle means including:*

*(1) an elongated rod extending from the handle far enough to reach from the lips of the user to the back of his oral cavity,*

*(2) a head at the end of said rod remote from said handle,*

*(3) a bore in said rod, and*

*(4) an aperture in said head communicating with said bore;*

*(c) power drive means in said handle means operatively coupled with said rod for oscillating the rod and head; and*

*(d) a passage for connecting said bore with a source of liquid.*

*16. A power driven oral appliance as set forth in claim 15 in which the appliance means head is a tufted brush and the aperture communicating with said bore is directed toward tufts of the brush.*

*17. A power driven oral appliance as set forth in claim 15 in which the appliance means head is an irrigator.*

*18. A power driven oral appliance as set forth in claim 15 in which the appliance means head is a massaging*

*head having a rubber tip and the aperture communicating with said bore is adjacent to said rubber tip.*

*19. A power driven oral appliance as set forth in claim 15 in which said power drive means is a fluid motor.*

*20. A power driven oral appliance as set forth in claim 19 in which said fluid motor is a liquid motor.*

*21. A liquid powered oral appliance comprising:*

*(a) handle means;*

*(b) a chamber in said handle means;*

*(c) a rotor suitably mounted in said chamber;*

*(d) means including a bore in said handle means for connecting said chamber to a source of liquid under pressure to drive said rotor;*

*(e) appliance means movably mounted on said handle means including:*

*(1) a rod operatively connected to said rotor to be oscillated thereby,*

*(2) a head on said rod,*

*(3) a bore in said rod and head communicating with said chamber, and*

*(4) an aperture in said head communicating with said bore and which is short relative to the length of said bore; and*

*(f) a valve for controlling the flow of liquid from said source into said chamber to drive said rotor at varying speeds.*

*22. A liquid powered oral appliance as set forth in claim 21 in which the operative connection of the rod to the rotor moves the head in the direction of the axis of said rod.*

*23. A liquid powered oral appliance as set forth in claim 21 in which the operative connection of the rod to the rotor moves the head in a direction transverse to the axis of said rod.*

*24. A liquid powered oral appliance as set forth in claim 21 in which the operative connection of the rod to the rotor moves the head in the direction of and transverse to the axis of said rod.*

*25. A liquid powered oral appliance as set forth in claim 21 in which the operative connection of the rod to the rotor moves the head angularly around the axis of said rod.*

*26. A liquid powered oral appliance as set forth in claim 21 in which the opertive connection of the rod to the rotor moves the head angularly around and in the direction of the axis of said rod.*

*27. An oral appliance comprising:*

*(a) means forming a passage having an inlet, a relatively long portion in one direction and at least one relatively short portion at an angle to said one direction terminating in an orifice,*

*(b) means on said passage forming means adjacent to said orifice for applying messaging action to oral tissue,*

*(c) a handle connected to the other end of said passage forming means,*

*(d) means for connecting the inlet of said passage to a source of liquid under pressure to cause liquid to flow through said passage and discharge from said orifice to supply liquid when desired for said messaging action, and*

*(e) mechanical means for oscillating said passage forming means relative to said handle.*

*28. An oral appliance as set forth in claim 27 in which said means for applying massaging action comprises a plurality of tufts of bristles and the orifice directs liquid toward said tufts.*

*29. An oral appliance as set forth in claim 27 in which said means for applying massaging action comprises at least one soft rubber tip.*

*30. An oral appliance as set forth in claim 27 in which said means for oscillating the passage forming means imparts motion toward and away from said handle.*

*31. An oral appliance as set forth in claim 27 in which said means for oscillating said passage forming means imparts motion toward and away from said handle and angularly around the axis of said long portion.*

*32. An oral appliance as set forth in claim 27 in which said means for oscillating said passage forming means imparts motion to the means for applying massaging action transverse to the axis of said long portion.*

References Cited

The following references, cited by the Examiner, are of record in the patented file of this patent or the original patent.

UNITED STATES PATENTS

| | | | |
|---|---|---|---|
| 736,607 | 8/1903 | Lane | 15—24 |
| 890,709 | 6/1908 | Richwood. | |
| 1,108,475 | 8/1914 | Roland | 15—24 |
| 1,476,433 | 12/1923 | Vandervoort | 15—22 |
| 1,641,494 | 9/1927 | Joseph | 15—24 |
| 2,283,314 | 5/1942 | Ckola | 15—24 |
| 2,285,865 | 6/1942 | Lowe et al. | 15—24 |
| 2,435,421 | 2/1948 | Blair | 15—22 |
| 2,492,966 | 1/1950 | Ckola | 15—24 X |
| 3,046,585 | 7/1962 | Ledingham et al. | 15—24 |

FOREIGN PATENTS

| | | |
|---|---|---|
| 1,250,455 | 12/1960 | France. |
| 598,871 | 10/1959 | Italy. |

EDWARD L. ROBERTS, *Primary Examiner.*

U.S. Cl. X.R.

128—66